April 30, 1963
E. V. ANDERSON ETAL
3,087,768
ENCLOSURE
Filed May 18, 1960
7 Sheets-Sheet 1
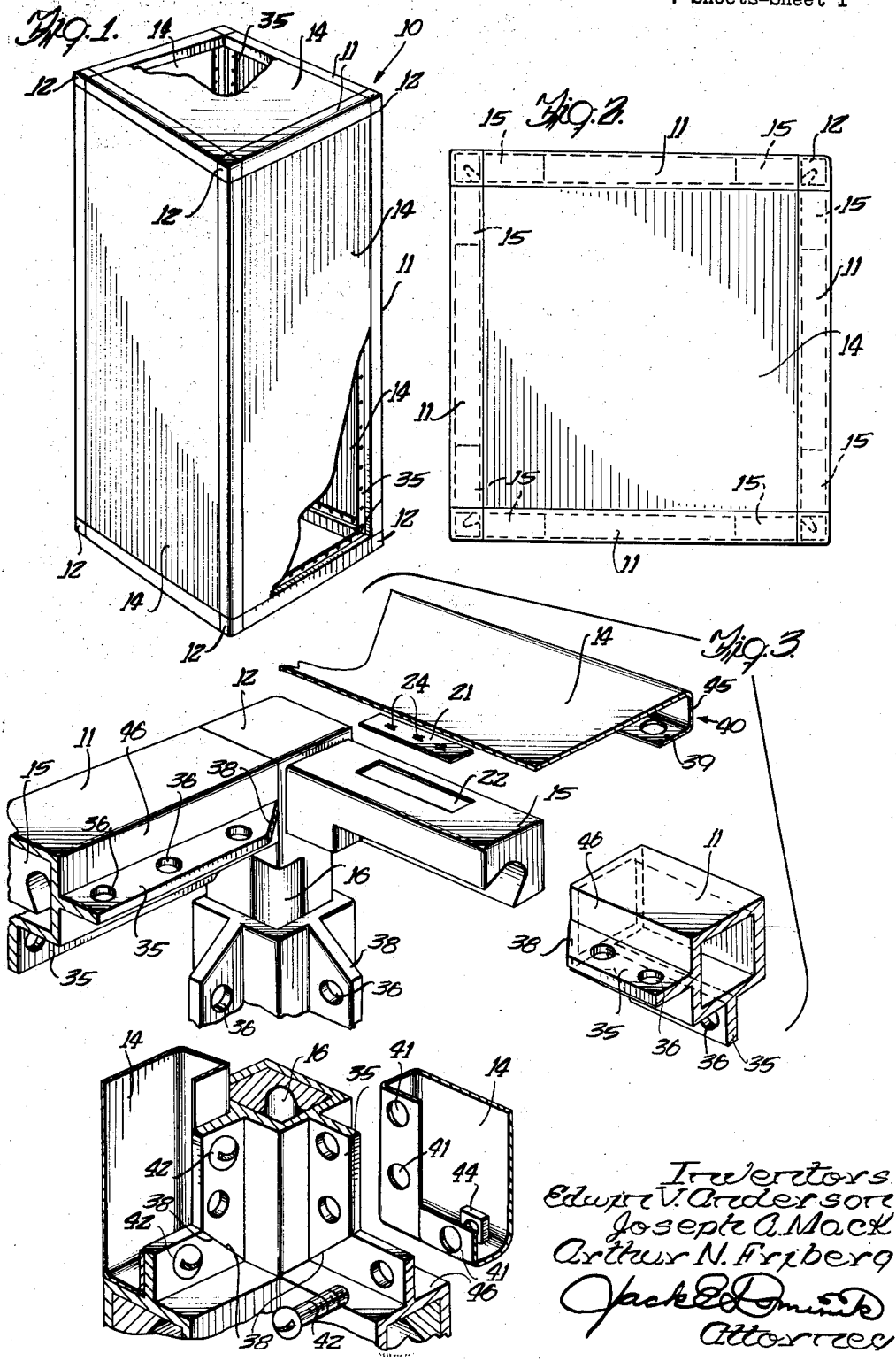

April 30, 1963 E. V. ANDERSON ETAL 3,087,768
ENCLOSURE
Filed May 18, 1960 7 Sheets-Sheet 2
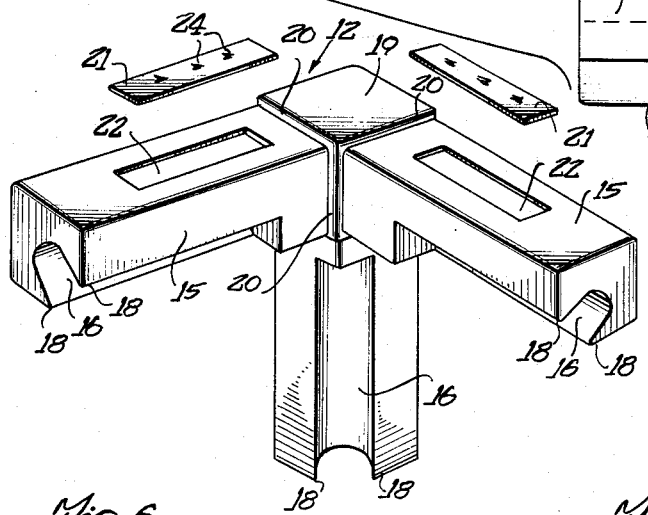
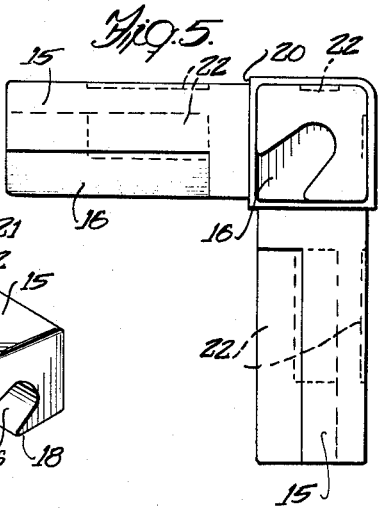
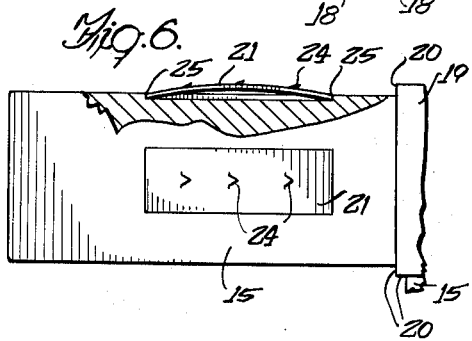
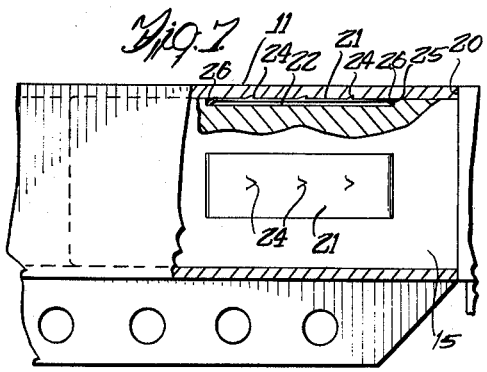
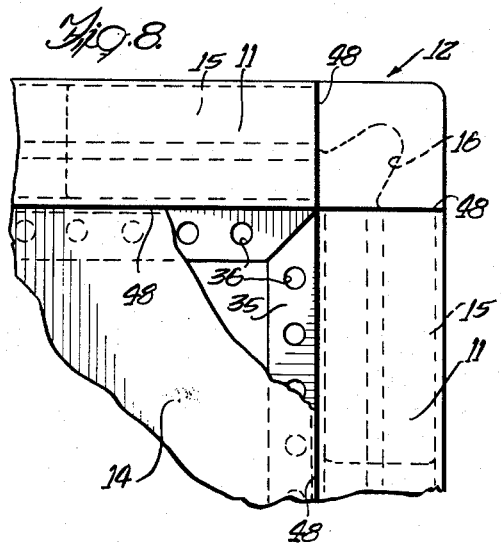
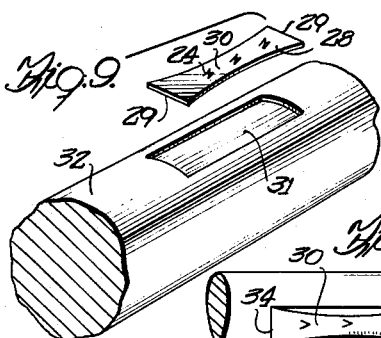
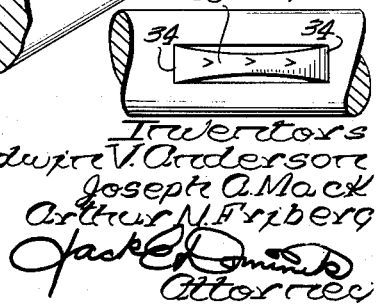
Inventors
Edwin V. Anderson
Joseph A. Mack
Arthur N. Friberg
Jack Dominik
Attorney April 30, 1963   E. V. ANDERSON ETAL   3,087,768
ENCLOSURE
Filed May 18, 1960   7 Sheets-Sheet 3
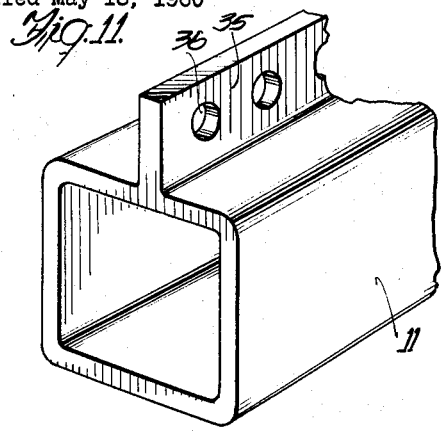
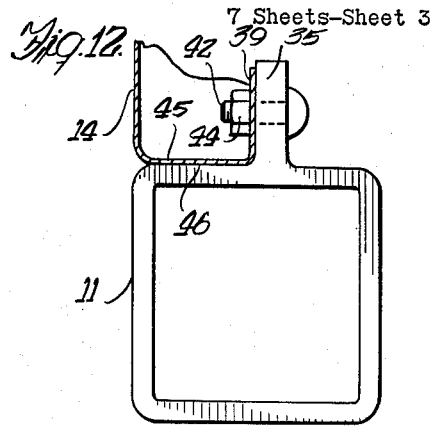
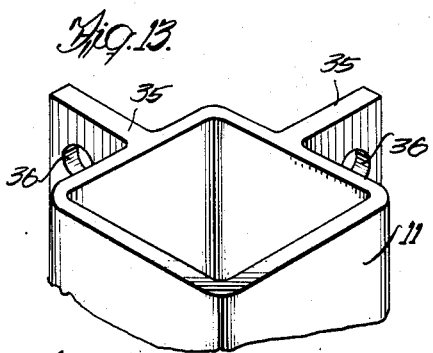
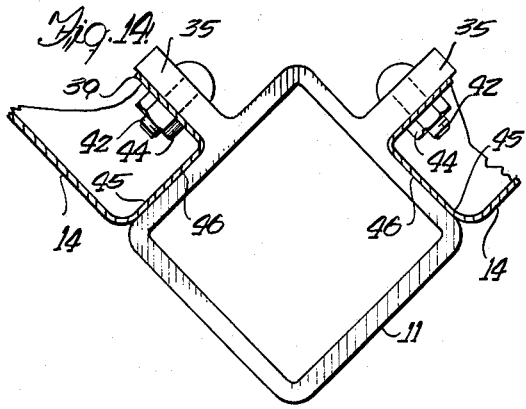
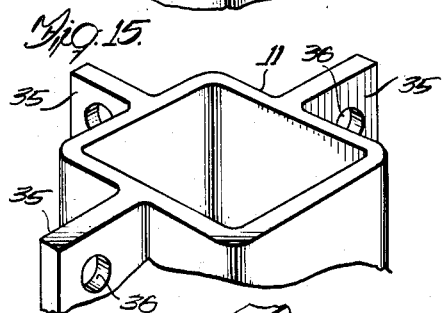
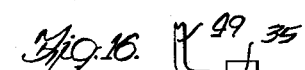
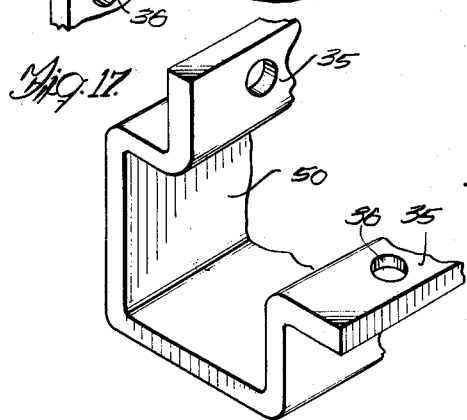
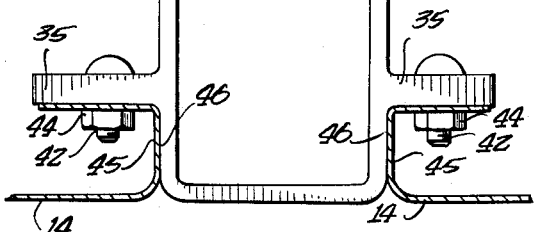
Inventors
Edwin V. Anderson
Joseph A. Mack
Arthur N. Friberg
Jack E. Dominik
Attorney April 30, 1963 E. V. ANDERSON ETAL 3,087,768
ENCLOSURE
Filed May 18, 1960 7 Sheets-Sheet 4
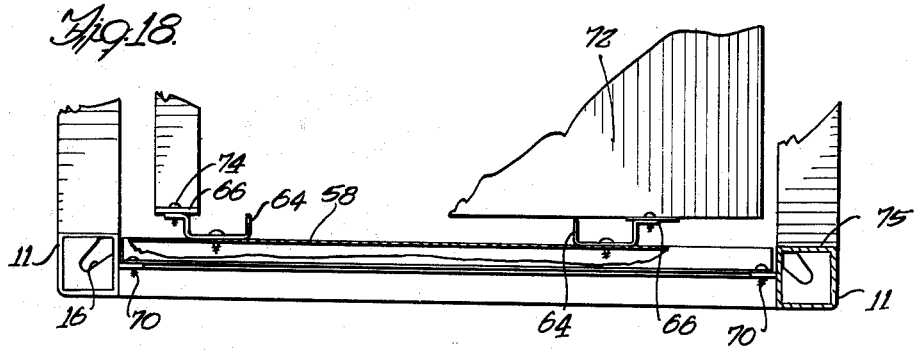
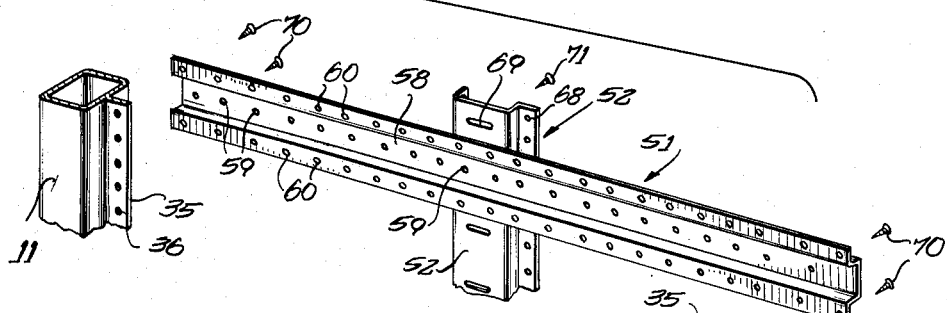
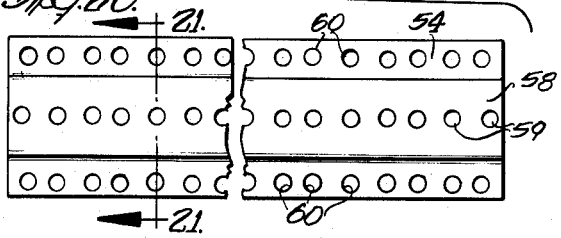
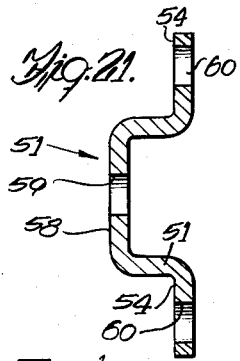
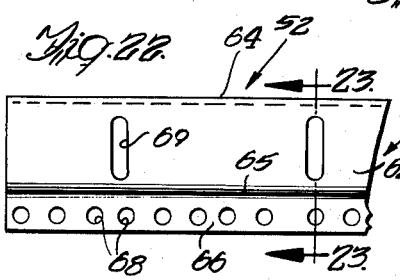
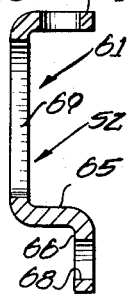
Inventors
Edwin V. Anderson
Joseph A. Mack
Arthur N. Friberg
Jack E. Dominik
Attorney

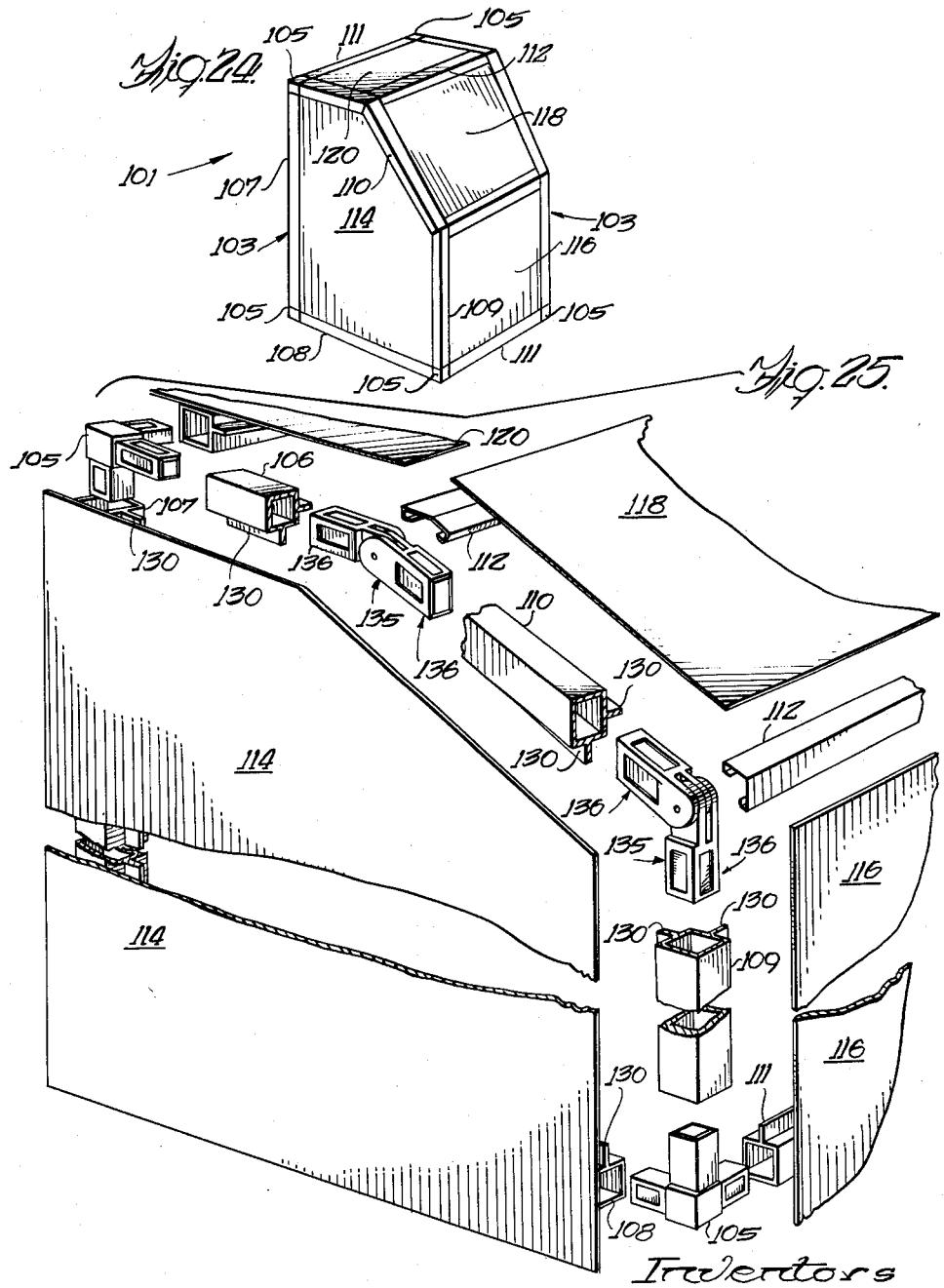

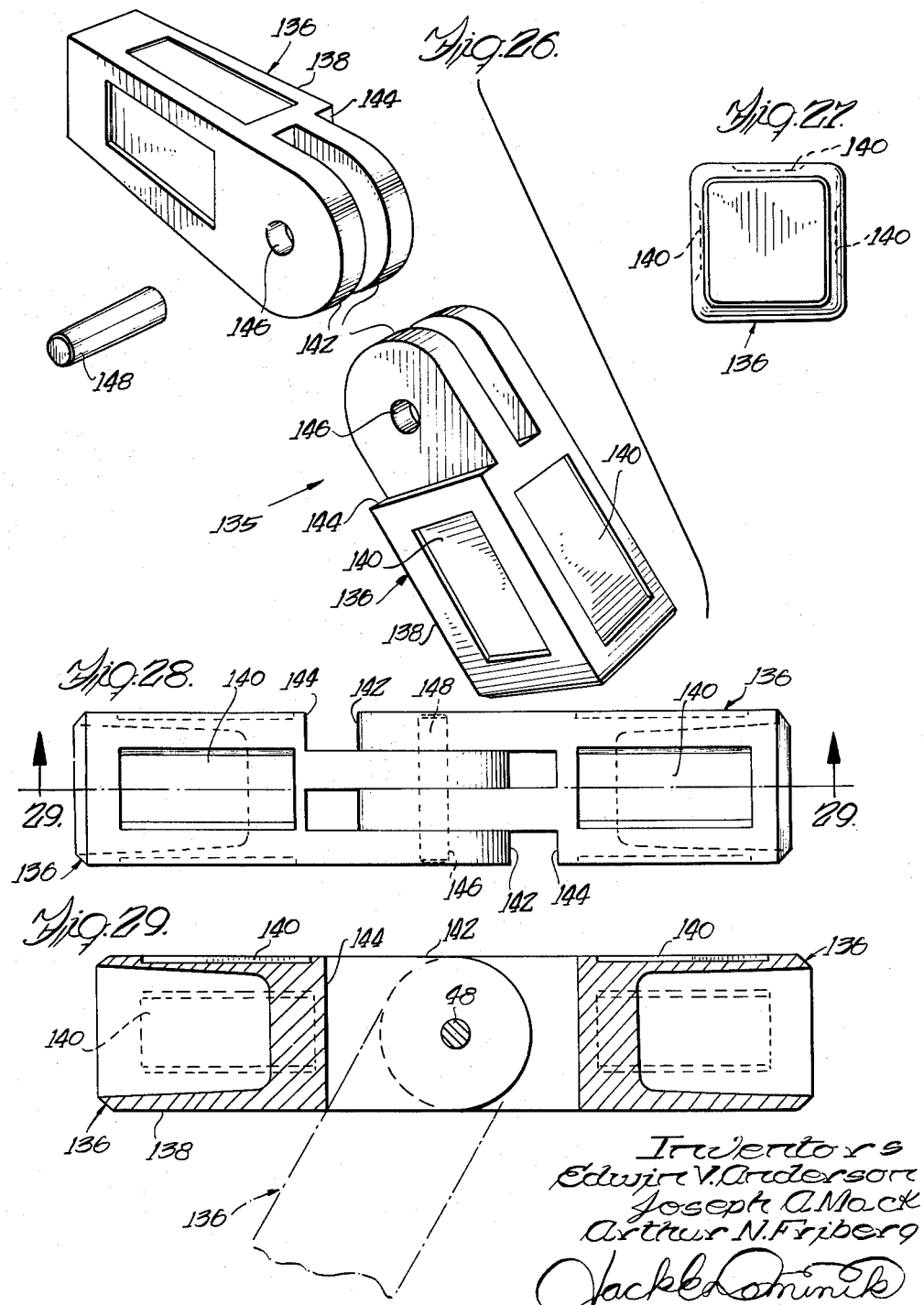

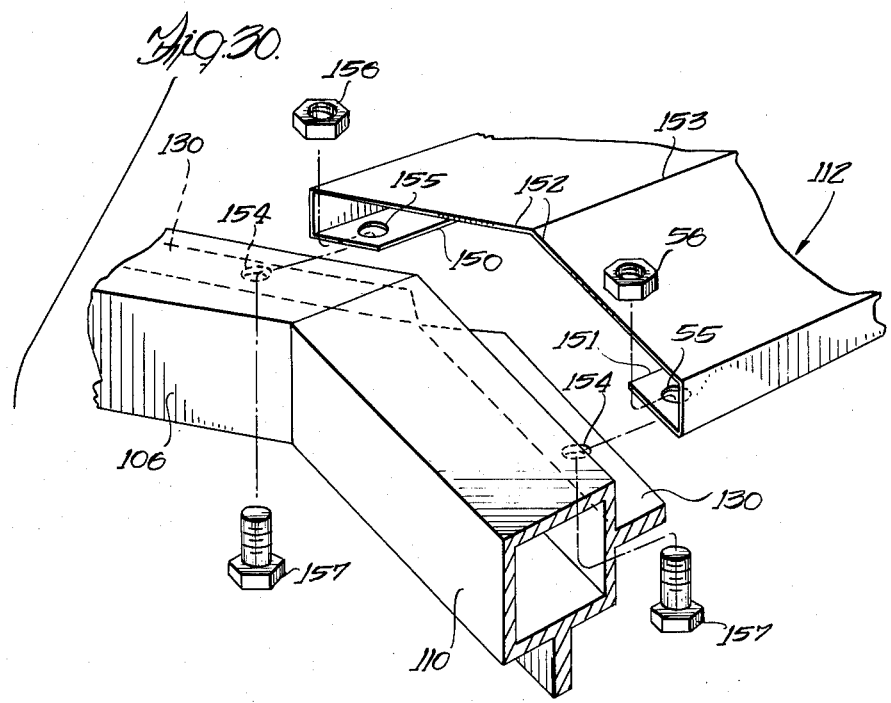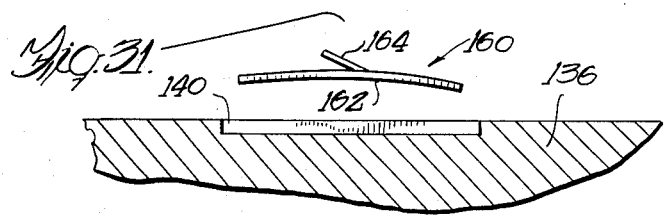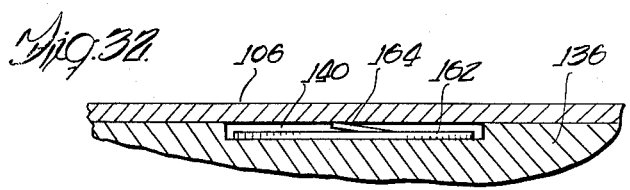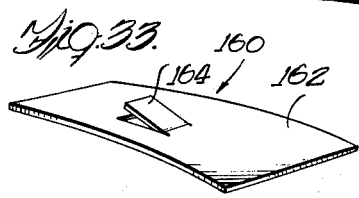

United States Patent Office 3,087,768
Patented Apr. 30, 1963

3,087,768
ENCLOSURE
Edwin V. Anderson, Joseph A. Mack, and Arthur N. Friberg, Morton Grove, Ill., assignors to Amco Engineering Co.
Filed May 18, 1960, Ser. No. 30,711
18 Claims. (Cl. 312—263)

This invention is a continuation-in-part of the co-pending application on an "Enclosure" Serial No. 804,909, filed April 8, 1959, and now abandoned.

The present invention relates to an enclosure. In one aspect it relates to a container defining that type of enclosure and parts therefor which are especially adapted for the housing of a wide variety of electronic elements. The subject enclosure can be formed as a kit for job-site erection, prefabricated for unit assembly at the factory, or completely assembled at the factory to customer specification. Since the structural elements are readily susceptible of extrusion or casting, the entire device may be fabricated from aluminum or magnesium or other similar metals which are lightweight and substantially corrosion-proof.

In view of the foregoing, it will be apparent that the principal object of the present invention is to provide an enclosure which is susceptible of manufacture from a kit, or assembly from prefabricated parts, or assembly by the manufacturer to the exact specification of the customer.

Another and important object of the invention is to furnish an enclosure which can be readily made from the light and non-corrosive metals to achieve the advantages of being corrosion-proof and extremely lightweight.

A further object of the invention is to provide a framework construction for a prefabricated type enclosure, which framework defines a prismatic shape and is capable of receiving panels for defining an enclosed volume. The edges of the prism are defined by hollow struts and female joints are provided at the end of said struts for receiving male members. The male members are of integral construction and are interfitted with a plurality of edge struts so that a rigid one piece construction holds together a plurality of edge struts at a mutual intersection.

In addition, the invention contemplates an advantageous corner construction which permits job-site assembly with an irreducible minimum of tools and which may be further sealed with sealing compound or gasketed in assembly to effectuate a splash-proof construction.

Still another object of the invention is to furnish an enclosure with an internal stringer and mounting construction which permits the recessed mounting of nineteen-inch standard electronic panels at any location selected by the purchaser.

Prior developments in the enclosure art are generally related to the construction of enclosures that define rectangular parallelepipeds. While these constructions may be eminently suitable for their purposes, the advent of automation has brought forth a new problem. Many manufacturing facilities, the chemical industry being a prime example, are constructing large instrument panels containing a large number of instruments such as measuring and control facilities. In order to provide sufficient flexibility to enable the addition of more instruments, or even the removal of certain installed instruments, the panel construction should most advantageously be capable of unitized construction. That is, entire sections of the panels should be susceptible to addition or subtraction to or from the installed unit.

Many of the installations referred to require a sloping surface either for the observation of measuring and control instruments, or to provide a sloping writing surface. This obviously departs from the rectangular configuration referred to above. In addition, when unitized construction is desired, the physical details of the prior art enclosures are modified to the point where tailor made enclosures result, and the unitization feature is lost. Such enclosures may not be interchangeable with their parent structures, even though both are derived from the same source.

Another and more specific object of the invention is to provide an enclosure framework which is susceptible to manufacture from a kit and which provides a sloping surface. In this connection, it is contemplated that the enclosure so constructed will retain enough of its original characteristics that upon disassembly it is capable of modification by the addition of standard elements to the point where it can be incorporated with other enclosures of different configuration. For example, the sloping surface enclosure could be reconstructed to a rectangular parallelepiped, or vice versa.

The manner of accomplishing the last named objects contemplates the provision of a standard structural element comprising a hinged joint or a knuckle joint having at least two elements which are relatively pivotable and designed for addition to other standard structural elements whereupon the knuckle joint is pivoted to the angle desired in providing the sloping surface. These elements are such a shape and construction that they can be received within other structural elements and hidden from view.

An even further object of the invention is to provide a prefabricated type enclosure which is unusually sturdy and yet can be assembled from small packaged parts in order to permit unusual access such as in submarines where everything must go through a twenty-six inch port, or in arctic communication stations where much of the construction material must be air-freighted to the job site.

Further objects and advantages of the present invention will become apparent as the following description proceeds, taken in conjunction with the accompanying illustrative drawings in which:

FIGURE 1 is a perspective partially broken view of a completely assembled enclosure illustrative of the type contemplated by the present invention;

FIGURE 2 is a top view of the enclosure shown in FIGURE 1 illustrating in phantom lines the relationship between the unique corner members and the edge struts;

FIGURE 3 is an enlarged partially broken, partially sectioned exploded perspective view of a pair of opposed corner members and their associated edge struts and panels illustrating how the enclosure is assembled at the job site;

FIGURE 4 is a perspective view of a corner member showing the locking plates in exploded relation with the corner members;

FIGURE 5 is a bottom view taken from underneath the corner member shown in FIGURE 4;

FIGURE 6 is a front elevation partially sectioned and partially broken of one of the three legs of a corner member showing the locking plate in place for assembly;

FIGURE 7 is an elevation similar to FIGURE 6 partially broken and partially sectioned to illustrate the assembled relationship between the edge strut, corner piece leg, and engaged locking plate;

FIGURE 8 is a partially broken enlarged top view of a corner of the enclosure shown in FIGURE 1 illustrating in darkened lines where gasketing material may be employed to splash-proof the construction and seal against leakage, dust, and other contaminants;

FIGURE 9 is a perspective partially exploded view of an alternative form of leg construction and locking plate in exploded relation with the leg;

FIGURE 10 is a top view of the alternative embodiment of the leg and locking plate shown in FIGURE 9, but with the locking plate in assembled relationship with the locking plate pocket;

FIGURE 11 is an enlarged perspective partially broken end view of a single-flanged edge strut;

FIGURE 12 is an end view of a single-flanged edge strut in broken section showing the assembled relationship between the single flange and one closure panel;

FIGURE 13 is a perspective broken view of an end of a double-flanged edge strut;

FIGURE 14 is a top broken view of the double-flanged edge strut shown in FIGURE 13 illustrating in partially sectioned, partially broken form the assembled relationship with two closure panels at a corner of the enclosure;

FIGURE 15 is a perspective enlarged partially broken view of an end of a three-flanged edge strut such as may be employed in unitizing two side-by-side enclosures;

FIGURE 16 is an end view of the three-flanged edge strut shown in FIGURE 15 illustrating in partial section on the assembled relationship with the associated closure panels;

FIGURE 17 is a partially broken perspective end view of an alternative embodiment edge strut which has two-edge flanges and in which the area between the two-edge flanges is open;

FIGURE 18 is a top partially broken, partially sectioned view illustrating the assembled relationship between an illustrative enclosure and an internally recessed mounted electronic unit;

FIGURE 19 is an enlarged perspective partially exploded, partially sectioned view illustrating the relationship between the edge struts and internal stringers whereby an almost infinite adjustability can be achieved between the support stringers and the locating of the internally mounted electronic unit;

FIGURE 20 is a front elevation partially broken of the horizontal mounting member shown in FIGURE 19;

FIGURE 21 is a transverse sectional view of the horizontal mounting member shown in FIGURE 20 taken along section line 21—21 of FIGURE 20;

FIGURE 22 is a front elevation of the vertical support member shown in FIGURE 19; and FIGURE 23 is an enlarged transverse section of the vertical support member shown in FIGURE 22 taken along section line 23—23 of FIGURE 22.

FIGURE 24 illustrates a cabinet constructed according to this invention and defining a right pentagonal prism that presents flush sides and smooth corners.

FIGURE 25 is an exploded view of the construction of one base and parts of the faces of the enclosure of FIGURE 24.

FIGURE 26 is an exploded detail of the knuckle joint construction employed in the framework of FIGURES 24 and 25.

FIGURE 27 is an end view of a portion of the knuckle joint.

FIGURE 28 is a top view of the knuckle joint.

FIGURE 29 is a view along section 29—29 of FIGURE 28.

FIGURE 30 is a detail showing the construction of the edges in the framework for the obtuse angles defined by frames as in FIGURES 24 and 25.

FIGURES 31, 32 and 33 show details of the locking plate construction.

Although as outlined above, the enclosure may take a wide variety of physical forms, the generally rectangular configuration of the enclosure 10 illustrated in FIGURE 1 will doubtless be widely used, and for purposes of this description, it will serve as a guide. The enclosure 10 is defined along its edges by means of edge struts 11 which are secured together by means of corner members 12 at the eight corners of the rectangular enclosure. As will appear in greater detail hereinafter, the edge struts all have integral mounting flanges which are employed for securing the closure panels 14 in place as well as for the attachment of the electronic unit mounting members which will be described in detail hereinafter.

Each of the corner members 12, as shown in phantom lines in FIGURE 2, includes three mutually perpendicular legs 15 which are interfitted within the edge struts 11. For purposes of speedy field erection, a unique locking mechanism is employed to secure the legs 15 within the edge struts 11.

Turning now to FIGURE 4, it will be seen that each of the legs 15 of the corner member 12 has a recessed centrally oriented cutout 16. The cutout 16 serves in reducing the weight of the corner member 12, and in addition, permits a slight deflection of the adjacent lips 18 which extend out to the edge of the leg cutout 16 further facilitating a snug fit of each leg within the edge struts 11.

The corner base 19 has a plurality of strut abutment shoulders 20 of a width approximating the thickness of the walls of the edge struts 11 so that when the edge strut is slipped over the leg 15 and abuts the strut abutment shoulders 20, a flush joint is effected. In order to firmly secure the edge struts 11 against dislocation from the legs 15 after insertion, locking plates 21 are provided which are proportioned to fit within locking plate pockets 22. In the event the temporary joint formed by the locking plates 21 needs to be further strengthened, each of the locking plates 21 may be provided with a plurality of barbs 24 which are oriented toward the corner base 19 as shown in FIGURES 6 and 7.

The locking plates 21 are advantageously formed from spring steel or other yieldable or resilient material. The length of the locking plate 21 is slightly more than the length of the pocket 22 so that the locking plate 21 will be deformed when the edge strut 11 is placed over the leg 15. In FIGURE 6 the abutting relationship between the ends of the locking plate 21 and the end shoulders 25 of the locking plate pocket is best illustrated. In FIGURE 7 there is shown the interfitted relationship between the locking plate 21 and the edge strut 11 after the end of the edge strut 11 abuts the corner shoulder 20. The ends 26 of the locking plate 21 are deformed slightly in their abutment with the end shoulder 25 of the locking plate pocket 22. When barbs 24 are provided, they engage with the softer metal of the wall of the edge strut 11 and further lock against dislocation as well as assisting to evenly position the edge strut 11 on the corner member leg 15. Here it will be appreciated that the depth of the locking plate pocket 22 should be somewhat greater than the thickness of the locking plate 21 to permit the necessary deformation required by the locking action to be achieved.

While a rectangular locking plate 21 has just been described in detail, it is contemplated that other configurations may be employed. For example, in FIGURE 9 there is shown an alternative locking plate 28 which has parallel ends 29 with a narrow mid-portion 30. The alternative pocket 31 is formed in the face of a curvilinear corner member leg 32. Barbs 24 may also be utilized as with the preferred embodiment corner member 12. In operation, the alternative embodiment locking plate is placed in the pocket 31 and abutted against the end shoulders 34 of the alternative pocket and used in the same manner as with the preferred embodiment discussed above. The yieldable pressure type interfit locks the corner sufficiently to permit assembly of the enclosure frame, after which the panels take over as the principal locking elements.

Referring back to FIGURE 3, it will be observed that the upper edge struts 11 have two side flanges 35. The side flanges 35 are provided with spaced mounting holes 36 and beveled ends 38 which effect a continuous flange frame as shown in the lower portion of FIGURE 3. After all of the edge struts 11 have been engaged with the corner members 12, and the entire enclosures 10 have been provided with a complete framework, the closure panels 14 are bolted into position. The closure panels 14 may be sheet material cut and drilled for bolting or otherwise securing in place in the area framed by the flanges 35. In these instances where a flush panel type enclosure is indicated, the closure panels 14 are provided with reversely folded end flange portions 40 having a closure mounting flange 39. The closure mounting flanges 39 are punched or otherwise supplied with a plurality of mounting holes 41 through which mounting bolts 42 are inserted and secured to mounting nuts 44. A lock washer, or self-locking bolt and nut combination may be employed. The reversely folded closure edges 40 are so coordinated with the edge struts 11 so that the overall width of the closure edge 45 flushes against the closure mounting side wall 46 of the edge strut 11 and as a result, the front of the closure is coplanar with the unflanged side of the edge strut 11. Where a splash-proof type construction is to be made, a sealing compound is applied at the corner joint as illustrated in FIGURE 8 in the darkened lines 48. The sealing compound 48 is applied along the interface between the legs 15 and the inside of the edge struts 11 as well as the joint between the strut abutment shoulders 20 and the end of the edge struts. In addition, the sealing compound may be applied where the closure mounting flange 39 abuts the closure mounting side wall 46 of the edge struts 11. Also, the sealing compound may be used at the junction of the beveled faces 38 of the side flanges 35. The same applies when a flat panel is employed.

The following will describe the use of various of the flanged edge struts in conjunction with the folded edge panel. It will be appreciated the usage is equally applicable with a flat panel member. Several edge strut constructions may be required in order to complete an enclosure to fill the exact need of the ultimate user. Turning now to FIGURE 11, it will be seen that a single side flange 35 has been formed on the edge strut 11. Since the edge struts 11 can be economically formed by extrusion of aluminum, magnesium, or other lightweight materials, the side flange 35 is formed as an integral part of the edge strut 11. Where the edge strut 11 may be used at the bottom of the enclosure, the single side flange construction is most desirable. In such an instance the closure panel 14 is secured by means of the bolt 42 and nut 44 which clamps the closure mounting flange 39 to the side flange 35 with the closure edge 45 snugly abutting the closure mounting side wall 46 of the edge strut 11.

Where a vertical edge strut 11 is involved to form a joint between two closure panels 14 meeting at right angles, an edge strut 11 with two side flanges 35 as shown in FIGURE 13 is desirable. The closure panels 14 are then secured to the vertical corner edge strut 11 in the manner shown in FIGURE 14 effecting a flush joint between the closure edge 45 and the closure mounting side wall 46.

In another instance where two enclosures 10 are to be erected for side-by-side unitized construction, it then becomes desirable to employ an edge strut 11 with three side flanges 35 as shown in FIGURE 15. The coplanar side flanges 35, as shown in FIGURE 16, have closure panels 14 secured to them in the manner as outlined above. The successive closure panels 14 are then in a coplaner and generally continuous relationship. The third side flange 35 then may be utilized for the mounting of internal support pieces 49, or other parts of the enclosure or electronic equipment as may prove desirable in each individual application.

Still another edge strut alternative configuration is shown in FIGURE 17 where one of the four corners of the edge strut 11 has been omitted, or in effect, the quarter of the edge strut 11 between the two side flanges 35 is completely omitted. This type construction is lighter in weight than the configuration of four-cornered edge strut 11 as defined above and the three-cornered edge strut 50 also will deflect slightly to permit a greater interfit tolerance between the corner member legs 15 and the three-cornered edge strut 50.

In addition to the unique edge strut and corner construction, an internal mounting assembly is provided which contemplates a plurality of horizontal racks 51 in cooperative relationship with vertical hangers 52. The horizontal rack 51 is shown in detail in FIGURES 20 and 21. There it will be seen that the horizontal rack 51 has a pair of coplaner edge channels 54 which extend from the side walls 55 of the rear panel 56. The rear panel base 58 is provided with a plurality of channel base mounting holes 59 in lateral alined relationship with the rack coplanar edge channel mounting holes 60. It will be noted that the mounting holes 59, 60 are in the staggered uniform relationship as required by the established modular constructions used in the electronic industry.

The vertical hangers 52 are illustrated in FIGURES 22 and 23. Like the racks, the vertical hangers 52 employ a channel section 61 as the principal structural element. The channel 61 includes a flat base member 62 and an open channel side wall 64 as well as a closed channel side wall 65. The closed channel side wall 65 has an extension for the vertical hanger mounting flange 66. The vertical hanger mounting flange 66 is provided with a plurality of modularly-spaced vertical mounting flange holes 68. Transverse adjustment mounting slots 69 are provided in the channel base 62, the long axis of the mounting slot being perpendicular with the closed channel side wall 65.

After the enclosure has been completed, the horizontal racks 51 are secured to the edge strut side flanges 35 by means of fasteners 70 such as shown in FIGURE 19. The rack edge channel mounting holes 60 are alined with the side flange mounting holes 36 of the strut edges 11 for securing by the fasteners 70. After the horizontal racks 51 have been securely placed in position, the vertical hangers 52 are then secured against the rack channel base 58 by adjusting the hanger mounting slot 69 over the appropriate channel base mounting hole 59 and then securing with a hanger fastener 71.

In FIGURE 18, it will be seen how the electronic unit 72 is then secured by means of the electronic unit fasteners 74 to the hanger mounting flange 66. The depth of the rack channel 56, as pointed out above, is such that the rack base 58 is flush with the opening face 75 of the front edge strut 11. Thus the electronic unit 72 can be recessed from the front of the enclosure, and still be provided with lateral clearance as is evident in the construction shown in FIGURE 18. It will be appreciated that the entire electronic unit 72 may be assembled within the enclosure 10 after the entire closure panel construction 14 has been assembled to the edge struts 11, and at a wide variety of preselected elevations and fore and aft positionings. Irrespective of where the side mount may appear on the electronic unit, the vertical hangers 52 are susceptible of extensive adjustment attributable to the elongate mounting slot 69 as well as the numerous available attachment positions along the rack 51.

In the earlier co-pending application No. 804,909 there is disclosed a cabinet frame construction wherein one piece three-legged corner members are provided. The cabinet frame construction is in accordance with FIGURES 1–23 above. Each leg of the corner members is mutually perpendicular to the others and is received within an edge strut having a uniform cross-section. The edge struts have a flange that faces away from the outside of any enclosure into which the edge strut may be incorporated. By assembly of eight corner members with an appropriate number of edge struts, it is possible to form a rectangular framework with the edge strut flanges so disposed as to define slightly recessed edge supports for panels which are mounted between the structural members of the frame defined by edge struts and corner members. The panels can then be formed from sheet aluminum or other materials and provided with reversely folded edges which mate with the flanges on the edge struts. In order to present a uniform and flush exterior, the corner members have shoulders disposed thereupon at appropriate places, and resilient means are disposed between the legs and the edge struts in such a fashion as to urge the edge struts out into flush relationship with the shoulders.

The instant invention, as will become apparent from the following disclosure, incorporates corner members constructed in a generally similar fashion. The corner members are included in a framework structure as the male members thereof, and inter-connected to the other corner members by edge struts. Where a sloping surface is desired, e.g., where a non-rectangular corner is desired, a novel hinged joint comprising two male members pivotally secured together and received entirely within the appropriate edge struts, is provided. A novel resilient means is also disposed between the edge struts and the corner members in order to better secure the two at each other and to bias the edge struts into flush engagement relative to external surfaces of the corner member.

A cabinet 101 constructed according to this invention and defining a right pentagonal prism or a heptahedral cabinet with flush sides is seen in FIGURE 24. The sides 103 of the cabinet comprise the bases of the prism, and in this case are pentagonal. The drawing shows a pentagon having three corners of 90° each, the remaining corners being complementary. The corners defining right angles are constructed using the three-legged corner members 105 which are generally like members 12 as described above, and in the co-pending application, and further described below. The corner members are interconnected by a plurality of hollow edge struts 106, 107, 108, 109 and 110. The edge struts 107 and 108 are cut off square at both ends, whereas the other three edge struts defining the base of the prism have at least one mitered end. Knuckle joints (hinged joints) according to this invention, but not capable of view in FIGURE 24, are disposed to define the corners between the pairs of edge struts 106, 110 and 109, 110. The other side of the cabinet, i.e., the other base of the prism, is constructed in like fashion and the corresponding square corners of the pentagon thereby defined are joined by edge struts 111 extending between corresponding corner members thereof. In addition, sheet metal corner members 112 extend between the corresponding ones of the corners containing the knuckle joints.

The corner members 105 differ slightly from corner members 12 in that the external configuration of the mutually perpendicular legs is generally square and the legs are hollow instead of having the cutout 16.

The construction described in the above paragraph sets forth the framework, i.e. the principal structural members, that define the enclosure. In order to complete the enclosure it is required to add panels to the framework defined by the foregoing construction. The panels are shaped pentagons 114, for the bases of the prism. The remaining panels 116, 118, 120, 122 and 124 (the latter two not being shown) are rectangular in shape and are disposed within the appropriate parts of the framework to thereby complete the sides of the prism. In order to provide a flush fit of the edge struts, corner members and panels, shoulders are provided on the corner members as mentioned above and described below, flanges are provided on the edge struts to define a means for receiving the panels, and in the preferred embodiment the edges of the panels are reversely folded to an appropriate dimension so that the surfaces will all be flush.

The exploded framework of FIGURE 25 illustrates in further detail the construction of a base 103 of FIGURE 24, but with the panels 114, 116, etc. removed for the sake of clarity. It will be observed that the flanges 130 of the various edge struts 106–110 face toward the inside of the polygon defined by the edge struts and also are in parallelism with the face of the panel such as 114, 116, etc. which will be disposed within the confines of the polygon thus defined. More than one flange 130 can be provided, as is observable in FIGURES 25 and 30, and as shown above in further detail as well as in the co-pending application No. 804,909, wherein there are shown edge struts having one, two, or three flanges disposed perpendicularly to each other. The knuckle joints 135 are likewise illustrated, with the legs 136 pivoted to the appropriate angles to define the angle necessary to present the sloping surface 118 on the cabinet that is ultimately constructed.

As best seen in FIGURES 26–29, the knuckle joints 135 comprise two legs 136. Each leg comprises a hollow body member 138 shaped to the contour of the inside of the edge struts, and having the pockets 140 to receive a locking spring or the like as described with relation to FIGURE 28. Extending from one end of the body are a pair of tabs 142 with the ends thereof having a semi-circular shape that is tangential to the sides of the body at the extreme ends thereof. One of the tabs is flush with the side of the body and the other tab is inset from the opposite side of the body to thereby provide a shoulder 144. The knuckle joint is completed by bringing the two legs together and alining the pin holes 146 which are present in all of the tabs 142 and then pivotally securing the one leg to the other by inserting a roll pin 148 or similar connector that permits rotational movement of one leg relative to the other. The amount of rotation of the leg is limited by the location of the shoulder 144. In one embodiment, the rotation is limited to 90° whereupon one side of the body 138 of one leg contacts the shoulder 144 on the other to act as a stop means for such rotational limitation. In the preferred embodiment, at least three pockets 140 are provided so that the knuckle joint can be disposed of any side or edge of a frame and present pockets for the reception of the resilient locking means.

The special corner members 112 (FIGURES 24, 25, and 30) are ordinarily formed on a sheet metal brake of the type found in most sheet metal shops. In the preferred embodiment, they are made of sheet aluminum, but can be constructed of any suitable material that is compatible from the standpoint of construction, corrosion, and the like with the remainder of the structure of the cabinet enclosure 1. The edges of 112 are reversely bent, as seen in FIGURE 30 at 150 and 151, to bring the edges 152 of the central portion into flush abutting relation with the outer edge of the edge strut. The central portion of 112 is bent along a line 153 to define the appropriate angle (see FIGURE 24 as well). The inturned flanges at 150 and 151 engage the flanges 130 on the edge struts that fit over the knuckle joints 135. They are secured to the flanges 130 by any convenient means, the preferred means being by drilling a hole 154 in the flange 130, a corresponding hole 155 on the inturned flange 150, 151 and then passing bolts 157 through the respective alined holes and threadedly engaging a nut 156. If desired, the nut can be welded or secured as by brazing to be in alignment with the hole 155. In lieu of the conventional threaded nut 156, it is also possible to use a leaf spring type of resilient material to threadedly engage the nut, the leaf spring also being susceptible to joinder by brazing or the like with the inturned flange 150, 151.

If desired, the edges of panel 118 that adjoin the reversely bent edges 150, 151 can be likewise reversely bent to provide a joint suitable for sealing as by using the sealing compound discussed with reference to FIGURE 8. The entire pentagonal cabinet 101 can be splash-proofed in the fashion described for FIGURE 8 by applying a sealing compound wherever two joints come together.

By applying the sheet metal construction such as illustrated in FIGURE 30, it is possible to construct a cabinet in the field using a combination of interchangeable elements such as the integral, one piece corner members 105 or 12 and the knuckle joints inter-connected by the hollow edge struts, and then to form appropriate connectors 112 from sheet metal to provide a sloping surface of any desired angle. Although convenient, it is not required to have factory fabricated elements for 112. In addition, the side panels 114 can be fabricated in the field on sheet metal brakes to provide the requisite shape and angle along the edge 110. Of course, where large quantities of cabinets are to be constructed to present the panel 118 all at the same angle, then the panels 114 and the connectors 112 are preferably fabricated at the factory for economic reasons. One advantage secured by the knuckle joint appears when such factory fabricated elements are assembled in the field because any slight mis-alinements of the sheet metal parts 112 and other inter-connecting elements are accounted for by the pin jointed action of the knuckle joints. The edges of the various panels 114–124 are reversely folded as at 150, 151 in order to provide a flush construction.

A novel locking plate construction is provided as seen in FIGURES 31–33. The locking plate 160 comprises a body member 162 of resilient material, e.g. spring steel, that is bowed and has a square ended lug 164 struck out from the central portion thereof. The length of the body portion 162 is less than that of the pocket 140 in which it is received. When placed in the pocket 140, the locking plate disposes the square end of the lug 164 toward the pin joint at the hole 146, or in the case of the corner members 105 or 12 presents the square end of the lug 164 toward the corner.

Using one of the joints between the edge strut and one of the knuckle joints as an example, a cross-section is taken longitudinally therethrough and is presented in FIGURE 32. Here, the hollow edge strut 106 has been fitted over the knuckle joint 135. In the ordinary case, the mitered joint between the edge strut 106 and the edge strut 110 passes along a diameter of the roll pin 148. The ends of the edge strut cooperate with the knuckle joint to define a male and female joint wherein the legs of the knuckle joint define male members that are completely received within the confines of the corresponding female joints in the end of hollow edge struts 106 and 110. A similar construction results in the joint between the edge struts 109 and 110. Unlike the construction involving the three-legged corner members 105, there is no external portion of the knuckle joint that is presented to view. The knuckle is disposed completely inside of the hollow edge strut.

The pocket and locking plate 160 construction is similar to that which is employed for the corner members 105. In fact, the same construction can be used. The locking plate is shorter than the pocket 140, so that compression of the locking plate as the hollow edge strut 106 is passed thereover causes the locking plate to expand longitudinally. In one embodiment there is sufficient longitudinal expansion to abut both ends of the pocket. The square ended lug 164 resiliently engages the internal wall of the hollow edge strut, but the engagement is frictional because the square edge of the lug does not substantially cut into the hollow edge strut. Alternatively, the end of the lug as viewed from the side (FIGURES 8, 9) can be rounded by a slight downward bending. Both the embodiment shown and the rounded end serve to reduce damage to the edge struts upon disassembly, and permit disassembly of the joint without destruction or damage to the female joint portion of the hollow edge strut.

In the preferred embodiment, the locking plates 160 are disposed only in the outside pockets 140 of the knuckle joints and corner members, whereby the edge strut is urged towards the outside of the enclosure as viewed in FIGURE 24. By this feature, it is possible to achieve a flush alinement of the edge struts with each other at the joints between edge struts 106 and 110 and edge struts 109 and 110, and also at the abutting engagement with the corner members 105 or 12. Not only is the flush construction obtained, but it is maintained by the constant outward urging action of the lock plate.

In such preferred embodiment, two springs are used between each leg or male member and its corresponding female joint formed in the hollow edge strut. One of the springs is disposed in each of the two pockets on the outside edges of the corner member or the knuckle joint, as the case may be. In this fashion, the hollow edge strut is urged diagonally or in two directions toward the outside corners. Thus, four lock plates would be required to complete one corner defined by the knuckle joint assembly, two lock plates being applied to each leg to urge the respective hollow edge struts 106 and 110 diagonally outward as seen in FIGURE 29.

In review, it will be apparent that the description of the enclosures shown for illustrative purposes may be completely manufactured at the factory. On the other hand, and for example, if an electronic customer requires two or three unusual shapes, they can be readily fabricated by the manufacturer or the customer from pre-cut parts. In those instances, where a kit must be prepared for qnock-down shipment to isolated locations, this can be readily done by the manufacturer. Also, the parts can be moved into relatively inaccessible locations by virtue of their individual compactness. By employing edge struts with one, two or three side flanges, a wide variety of closure configurations can be effected, and indeed, pairs and larger multiples of enclosures may be unitized. Additionally, the framework for cabinets and enclosures with sloping surfaces can be tailor-made from standard components. Also, existing cabinets and enclosures can be converted to those with sloping surfaces.

Although several embodiments of the invention have been shown and described in full here, there is no intention to thereby limit the invention to the detals of such embodiments. On the contrary, the intention is to cover all modifications, alternative embodiments, usages and equivalents of the enclosure as fall within the spirit and scope of the invention, specification and appended claims.

We claim:

1. A frame comprising a plurality of hollow edge struts all of uniform cross-section and disposed to define a pentagonal cross-section, the end of each strut providing a female joint; two adjacent corners of said pentagon each including a pair of like constructed legs, means for pivotally securing one end of each leg to a corresponding end of the other leg in the pair, each such pair providing male members received entirely within the ends of the hollow edge struts defining the two adjacent corners; the remaining corners having integral rigid corner members with legs defining male members disposed at fixed angles to each other, the legs being received within the remaining ends of the hollow edge struts, and resilient means disposed in said two adjacent corners to urge the hollow edge struts toward the outside of the frame.

2. A frame according to claim 1 wherein each of said edge struts has flange means along the sides thereof whereby urging of the struts by said resilient means brings the respective flange means into alignment suitable for receiving panels or other associated members.

3. A frame comprising a plurality of hollow edge struts defining a pentagonal cross-section, two adjacent corners of said pentagon each including pin-joined members received entirely within hollow edge struts, the remaining corners having integral rigid corner members defining predetermined angles and received at least partly within said hollow edge struts, and resilient means disposed in said two adjacent corners to urge the hollow edge struts toward the outside of the frame.

4. A frame according to claim 3 that comprises a cabinet frame wherein said members and edge struts are of metallic materials.

5. A frame comprising a plurality of rectangular hollow edge struts all of uniform rectangular cross-section and disposed to define a pentagonal frame cross-section, the end of each strut providing a rectangular female joint; two adjacent corners of said pentagon each including a pair of like constructed legs of rectangular cross-section, means for pivotally securing one end of each leg to a corresponding end of the other leg in the pair, each such pair providing rectangular male members received entirely within the ends of the hollow edge struts defining the female joints at the two adjacent corners; the remaining corners having integral rigid corner members with legs of rectangular cross-section defining male members disposed at fixed angles to each other, the legs being received within the remaining ends providing female joints of the hollow edge struts; and resilient means disposed in said two adjacent corners to urge the hollow edge struts toward the outside of the frame and along a line diagonal to the rectangular cross-section of the respective struts.

6. A frame construction, for presenting a fixed sloping surface on a cabinet enclosure, comprising a pair of intersecting hollow edge struts, both struts having the same internal configuration to respectively define a female joint adjacent the intersection and being mitered to define an angle for presenting said fixed sloping surface and to place the hollow portion of one strut completely in communication with the hollow portion of the other strut; a knuckle joint including first and second legs defining male members shaped to interfit with the internal configuration of the struts, and means to pivotally connect the first leg to the second leg; said knuckle joint being completely disposed internally of said edge struts with each leg extending into the female joint adjacent the intersection provided by one of said edge struts; and resilient means, disposed between each of said legs and the internal configuration of the edge strut into which the leg extends, for resiliently connecting the leg to the corresponding edge strut.

7. A frame construction according to claim 6 wherein each leg has a depression extending longitudinally on the outside of the leg, for receiving the resilient means; and the resilient means comprises a resilient bowed body member of a length to fit in said depression with a flat-ended tab struck obliquely outwardly therefrom and extending to the outside of the bowed body; the body member of the resilient means being convexly disposed in said depression with the tab extending obliquely toward the means to pivotally connect, and the internal configuration of the edge struts being in such proportion relative to the knuckle joint legs that the body member of each resilient means is resiliently at least partially flattened to thereby resiliently connect the legs to corresponding ones of the edge struts.

8. A frame construction for presenting a fixed sloping surface on a cabinet enclosure, comprising a pair of intersecting hollow edge struts, both struts having a rectangular internal configuration to respectively define a rectangular female joint adjacent the intersection and being mitered to define an angle for presenting said fixed sloping surface and to place the hollow portion of one strut completely in communication with the hollow portion of the other strut; a knuckle joint including first and second legs defining male members rectangularly shaped to interfit with the internal configuration of said struts, and means to pivotally connect the first leg to the second leg; said knuckle joint being completely disposed internally of said edge struts with each leg extending into the female joint adjacent the intersection provided by one of said edge struts; and resilient means, disposed between each of said legs and the internal configuration of the edge strut into which the leg extends, for resiliently connecting the leg to the corresponding edge strut.

9. A frame construction according to claim 8 wherein each leg has a depression extending longitudinally on the outside of the leg, for receiving the resilient means; and the resilient means comprises a resilient bowed body member of an uncompressed length less than said depression with a flat-ended tab struck obliquely outwardly therefrom and extending to the outside of the bowed body; the body member of the resilient means being convexly disposed in said depression with the tab extending obliquely toward the means to pivotally connect, and the internal configuration of the edge struts being in such proportion relative to the knuckle joint legs that the body member of each resilient means is resiliently at least partially flattened to thereby resiliently connect the legs to corresponding ones of the edge struts.

10. A frame construction according to claim 8 wherein each leg has a depression extending longitudinally of the leg, for receiving the resilient means, and facing toward the outside of the frame; a plurality of resilient means, each comprising a resilient bowed body member, of a length to fit in said depression, with a flat-ended tab struck obliquely outwardly therefrom and extending to the outside of the bowed body; the body member of each resilient means being disposed in said depression with the tab extending obliquely toward the means to pivotally connect, and the internal configuration of the edge struts being in such proportion relative to the knuckle joint legs that the body member of each resilient means is resiliently at least partially flattened to thereby resiliently connect the legs to corresponding ones of the edge struts by urging the hollow edge struts toward the outside of the frame.

11. A frame construction according to claim 8 wherein each leg has a pair of depressions extending longitudinally of the leg and disposed toward the outside of the frame, for receiving the resilient means; a plurality of resilient means, one disposed in each depression; each resilient means comprising a resilient bowed body member of a length to fit in said depression with a flat-ended tab struck obliquely outwardly therefrom and extending to the convex side of the bowed body; the body member of each resilient means being disposed in said depression with the tab extending obliquely toward the means to pivotally connect, and the internal configuration of the edge struts being in such proportion relative to the knuckle joint legs that the body member of each resilient means is resiliently at least partially flattened to thereby resiliently connect the legs to corresponding ones of the edge struts and to bidirectionally urge the rectangular hollow edge strut toward the outside of the frame.

12. A cabinet frame defining a right pentagonal prism comprising a construction of a base of the prism that includes four edge struts each of which is disposed at a right angle to at least one adjoining edge strut, a fifth edge strut disposed obliquely between two of said four edge struts, all of the edge struts being hollow and of uniform internal and external cross-section, three hollow corner members each having three mutually perpendicular hollow legs with an external contour conforming to the internal cross-section of said edge struts and disposed between two of said four edge struts with two of the legs extending into said edge struts and the third leg extending toward the other base of the prism, two knuckle joints each comprising two legs of the same contour as the internal cross-section of the edge struts pivotally secured together, each knuckle joint being disposed with one of the legs thereof extending into one of said four edge struts and the other leg thereof extending into the fifth edge strut, the other base of the prism being constructed in like manner and supported in parallelism with the first-mentioned base by three edge struts of equal length extending between corresponding ones of the third legs of the corner members in each base.

13. A cabinet frame defining a right pentagonal prism comprising a construction of a base of the prism that includes four edge struts each of which is disposed at a right angle to at least one adjoining edge strut; a fifth edge strut disposed obliquely between two of said four edge struts; all of the edge struts being hollow and of uniform rectangular internal cross-section; three hollow corner members each having three mutually perpendicular legs with an external rectangular contour conforming to the internal cross-section of said edge struts and disposed between two of said four edge struts with two of the legs extending into said edge struts and the third leg extending toward the other base of the prism; two knuckle joints, each comprising a pair of legs, of the same contour as the corner member legs, and means to pivotally secure together said pair of legs, each knuckle joint being disposed with one of the legs thereof extending into one of said four edge struts and the other leg thereof extending into the fifth edge strut, the other base of the prism constructed in like manner and supported in parallelism with the first-mentioned base by three edge struts of equal length extending between corresponding ones of the third legs of the corner members in each base.

14. A cabinet frame defining a right pentagonal prism comprising a construction of a base of the prism that includes four edge struts each of which is disposed at a right angle to at least one adjoining edge strut; a fifth edge strut disposed obliquely between two of said four edge struts; all of the edge struts being hollow and of uniform rectangular internal cross-section; three hollow corner members each having three mutually perpendicular legs with an external rectangular contour conforming to the internal cross-section of said edge struts and disposed between two of said four edge struts with two of the legs extending into said edge struts and the third leg extending toward the other base of the prism; two knuckle joints, each comprising a pair of legs, of the same contour as the corner member legs, and means to pivotally secure together said pair of legs, each knuckle joint being disposed with one of the legs thereof extending into one of said four edge struts and the other leg thereof extending into the fifth edge strut, the other base of the prism constructed in like manner and supported in parallelism with the first-mentioned base by three edge struts of equal length extending between corresponding ones of the third legs of the corner members in each base, and resilient means disposed between selected ones of said legs and its corresponding edge strut to resiliently urge the one into engagement with the other.

15. An instrument enclosure cabinet comprising, in combination, a plurality of edge struts, each of said edge struts having a central open portion, flanges along the sides of said edge struts, a plurality of three-legged corner members, said corner members having three mutually perpendicular legs with an external configuration proportioned for a sliding fit within the central open portion of the edge struts, a leg pocket along one of the faces of a corner leg, a yieldable lock plate proportioned to deformingly fit within the leg pocket and to establish a yieldable connection between said pocket and the internal part of the adjacent edge strut, and a plurality of closure panels having edge mounting portions, means for securing the panel edge mounting portions to the edge strut flanges, all elements proportioned to effect an interfit whereby the three-legged corner members are locked to the edge struts by means of their legs fitting within the edge struts and held in place by the deformation of the locking plate, while the closure panel mounting portions are secured to the edge strut flanges thereby effecting a closure of preselected areas between the edge struts.

16. An instrument enclosure cabinet comprising, in combination, a plurality of edge struts, each of said edge struts having a square central open portion within closed side walls, flanges along the sides of said edge struts, a plurality of three-legged corner members, said corner members having three mutually perpendicular legs with an external square configuration proportioned for a sliding fit within the central open portion of the edge struts, a flat pocket along one of the faces of each corner leg, a yieldable flat lock plate proportional to deformingly fit within the leg pocket, a plurality of panels having reversely folded edge mounting flanges and means for securing the panel flanges to the edge strut flanges, all elements proportioned to effect an interfit whereby the three-legged corner members are locked to the edge struts and held in place by the locking plate while the closure plate flanges are secured to the edge strut flanges thereby effecting a closure flush with the edge struts.

17. An instrument enclosure cabinet comprising, in combination, a plurality of edge struts, each of said edge struts having a square central open portion, flanges along the sides of said edge struts, a plurality of three-legged corner members, said corner members having three mutually perpendicular legs with an external square configuration proportioned for a sliding fit within the central open portion of the edge struts, a flat pocket along at least one of the faces of each corner leg, a yieldable prestressed lock plate proportioned to deformingly fit within the leg pocket, barbs extending from each pre-stressed lock plate, and a plurality of panels having edge mounting portions, means for securing the panel edge mounting portions to the edge strut flanges, all elements proportioned to effect an interfit whereby the three-legged corners are locked to the edge struts by means of their legs fitting within the edge struts and held in place by the locking plate barbs, while the closure plate mounting portions are secured to the edge strut flanges thereby effecting a panel closure flush with the edge struts.

18. An instrument enclosure comprising, in combination, a plurality of edge struts, each of said edge struts having a central open portion defining an inner face, a plurality of not less than six three-legged corner members, said corner members having three mutually perpendicular legs with an external configuration proportioned for a sliding fit within the central open portion of the edge struts and defining an outer face; locking means including means defining a recess in one of the said faces, and a resilient locking member proportioned to fit within said recess and yieldably bear against the other said face; a plurality of panels, attachment means for securing said panels to the edge struts, the whole in such combination that all elements are proportioned to effect an interfit whereby the three-legged corners are secured to the edge struts by their locking means while the panels are fixed into position thereby effecting a lock of all elements in the enclosure.

References Cited in the file of this patent

UNITED STATES PATENTS

| | | |
|---|---|---|
| 546,152 | Hieronymus | Sept. 10, 1895 |
| 556,833 | Patterson | Mar. 24, 1896 |
| 985,625 | Olson | Feb. 28, 1911 |
| 1,830,127 | Newcomb | Nov. 3, 1931 |
| 1,903,457 | Holstein | Apr. 11, 1933 |
| 1,998,049 | Fulton | Apr. 16, 1935 |
| 2,126,112 | Holderle et al. | Aug. 9, 1938 |
| 2,167,525 | Rosendale | July 25, 1939 |
| 2,231,068 | Harrington | Feb. 11, 1941 |
| 2,326,507 | Welch | Aug. 10, 1943 |
| 2,371,493 | Aschinger | Mar. 13, 1945 |
| 2,480,568 | Garvin | Aug. 30, 1949 |
| 2,554,610 | Benson | May 29, 1951 |
| 2,615,775 | Claybourn et al. | Oct. 28, 1952 |
| 2,765,886 | Tedaldi et al. | Oct. 9, 1956 |
| 2,806,755 | Glass | Sept. 17, 1957 |
| 2,912,294 | Wells | Nov. 10, 1959 |

FOREIGN PATENTS

| | | |
|---|---|---|
| 25,318 | Great Britain | Dec. 6, 1905 |
| 707,201 | France | Apr. 13, 1931 |
| 253,917 | Switzerland | Nov. 16, 1948 |